(12) United States Patent
Finney

(10) Patent No.: US 6,580,563 B1
(45) Date of Patent: Jun. 17, 2003

(54) IMAGE DETECTION SYSTEM

(75) Inventor: Huw Bevis Finney, Maidenhead (GB)

(73) Assignee: Keller Limited, Windsor (GB)

( * ) Notice: Subject to any disclaimer, the term of this patent is extended or adjusted under 35 U.S.C. 154(b) by 0 days.

(21) Appl. No.: 09/936,704
(22) PCT Filed: Feb. 28, 2000
(86) PCT No.: PCT/GB00/00688
§ 371 (c)(1), (2), (4) Date: Feb. 5, 2002
(87) PCT Pub. No.: WO00/55671
PCT Pub. Date: Sep. 21, 2000

(30) Foreign Application Priority Data

| Mar. 16, 1999 | (GB) | 9906042 |
| Sep. 4, 1999 | (GB) | 9920828 |
| Nov. 15, 1999 | (GB) | 9926836 |

(51) Int. Cl.[7] .................. G02B 27/14; G02C 1/00; G02C 7/10; G09G 5/00; H04N 15/00
(52) U.S. Cl. .......... 359/632; 359/630; 351/44; 351/158; 351/210; 345/7; 345/8; 348/51; 348/53; 250/334
(58) Field of Search .................. 359/630, 632, 359/699, 700; 345/7, 8, 53; 351/44, 158, 210; 348/51, 53; 250/334, 338.1

(56) References Cited

U.S. PATENT DOCUMENTS

| 3,867,633 A | * | 2/1975 | Patrick et al. | 250/334 |
| 5,106,179 A | * | 4/1992 | Kamaya et al. | 351/158 |
| 5,341,181 A | * | 8/1994 | Godard | 351/210 |
| 6,046,712 A | * | 4/2000 | Beller et al. | 345/8 |

FOREIGN PATENT DOCUMENTS

| FR | 1.575.798 | * | 7/1969 |
| WO | 93/01683 | * | 1/1993 |
| WO | 96/36271 | * | 11/1996 |

\* cited by examiner

Primary Examiner—Loha Ben
(74) Attorney, Agent, or Firm—Barnes & Thornburg

(57) ABSTRACT

An image detection system comprises a camera (2) for generating an electrical output signal representative of the detected image. The camera is carried by a headset (1, 3) for attachment to the head of a user, and comprises a transducer (6; 106) for generating an electrical output in response to light incident thereon. Magnifying means (22) are situated in the path of light to the transducer, and is arranged to magnify the detected image. The transducer and magnifying means are positioned in such a way that, in use, the portion of the path of light passing through the magnifying means extends laterally across the front of the user's head, enabling the system to be of a relatively compact construction. The camera may include focusing means which is operatively linked to the camera body in such a way that changing the attitude of the camera alters its focus, so that tilting the camera downwards causes it to focus on proximate objects, whilst focused images of distant objects can be obtained by tilting the camera upwards.

22 Claims, 3 Drawing Sheets

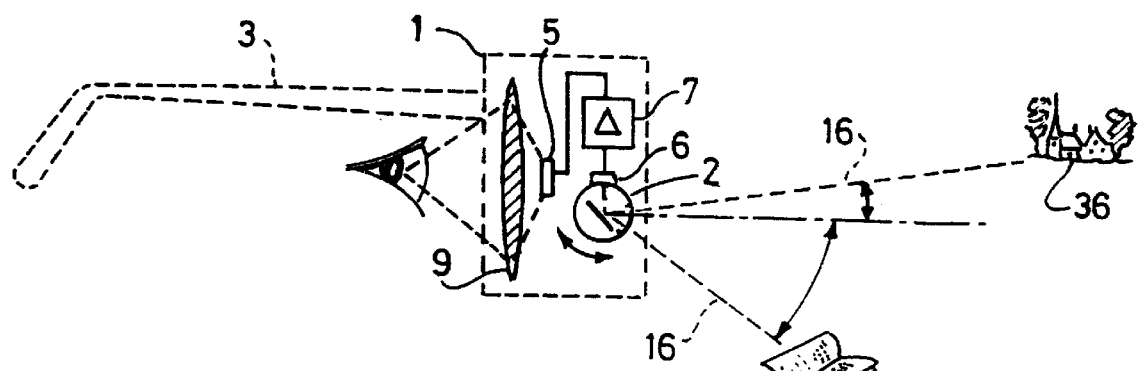
Fig. 1
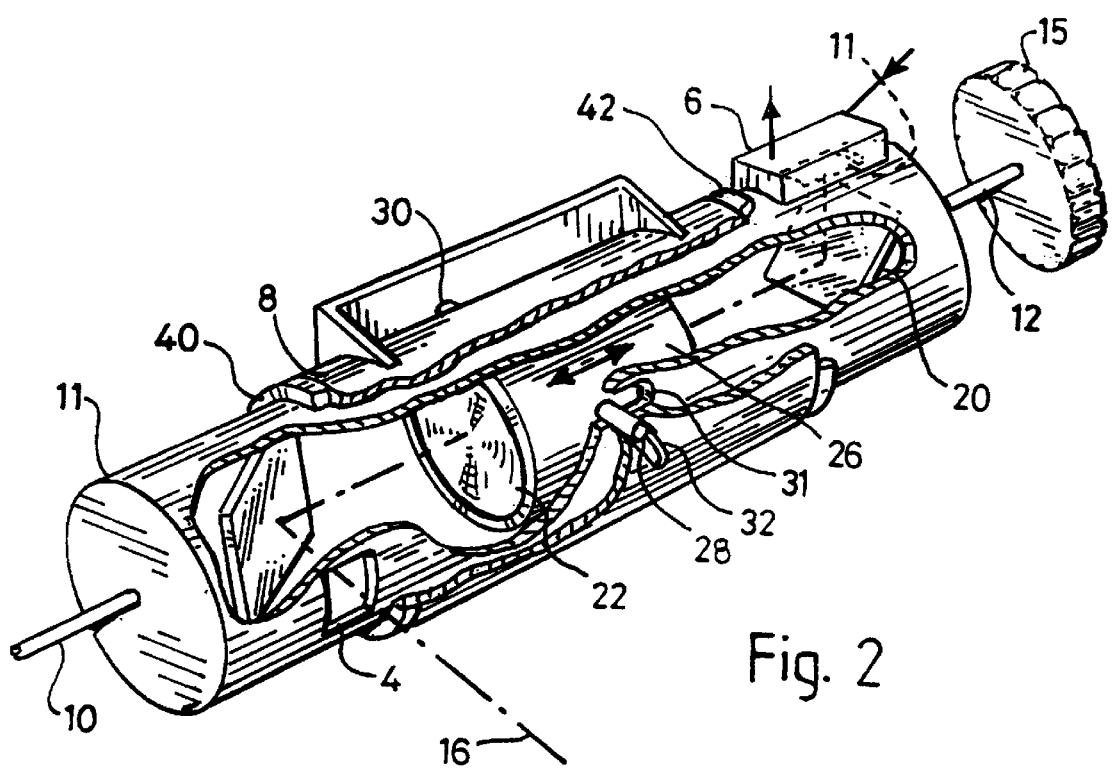
Fig. 2
Fig. 3a
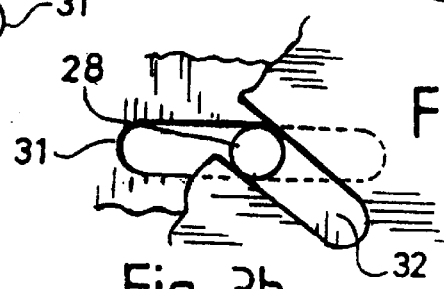
Fig 3b
Fig. 3c

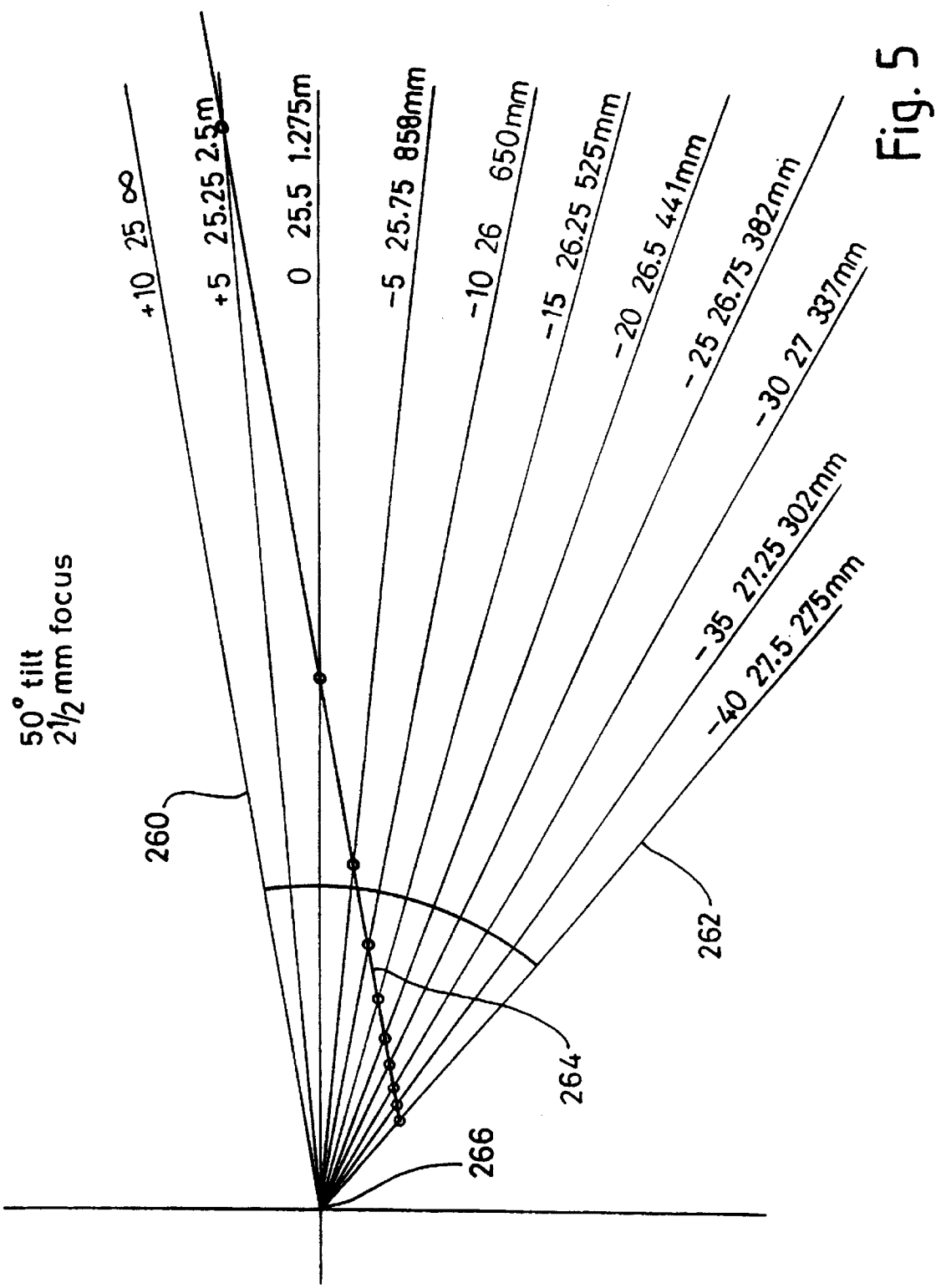

IMAGE DETECTION SYSTEM

FIELD OF THE INVENTION

This invention relates to an image detection and magnification system and particularly, but not exclusively, to a low vision rehabilitation system.

BACKGROUND TO THE INVENTION

Low vision rehabilitation systems are commonly used to provide assistance to visually impaired persons, particularly to individuals whose vision in either or both eyes has been impaired as a result of retinal damage. Such a system presents the user with a magnified image of a scene. Although the damaged portion of the user's retina cannot adequately detect portions of the magnified image, it has been found that a user can more easily see features using the still functional portions of his or her retina as a result of the magnification.

There are some purely optical low vision rehabilitation systems which are mounted on a headset to be worn by the user. Other types of system use a video camera and display, also mounted in a headset. This latter type of system can provide a brighter image than a purely optical system, and can also be equipped with a facility for image enhancement (by, for example, increasing contrast between light and dark areas of an image), which can be particularly useful for activities such as reading. However, the camera based systems tend to be cumbersome, and obtrusive.

This is partly because the camera needs to be able to provide a path for light through the camera's magnifying lens system and onto its transducer (e.g. a CCD chip) which is sufficiently long to enable the desired magnification to be achieved.

SUMMARY OF THE INVENTION

According to a first aspect of the invention, there is provided an image magnification and display system comprising a camera for generating an electrical output signal representative of the detected image, the camera being carried by a headset for attachment to the head of a user, the camera comprising a transducer means for generating an electrical output in response to light incident thereon and magnifying means, situated in the path of light to the transducer means, the transducer means and magnifying means being positioned such that, in use, the portion of the path of light passing through the magnifying means extends laterally across the front of the user's head.

Thus, in use, the camera is accommodated across the front of the user's face, which is a far more compact arrangement than at least some known camera based systems in which said path extends from the front towards the rear of the user's head, and the camera as a result has to be mounted on top of the headset or has to have a barrel which projects forwards from the headset. Consequently the system according to the present invention can be made more attractive than such known arrangements. Furthermore, the system exerts a smaller moment on the headset than is the case with a known arrangement with top mounted or forward projecting camera barrels, and therefore has a lower apparent weight than known systems.

Preferably, with the headset mounted on the head of a user, the portion of said path extends horizontally across the user's face, preferably from one side of the user's nose to the other.

To that end, the camera may to advantage further comprise an elongate housing having at one end region an entrance for incident light, the transducer means being situated in the region of the opposite end of the housing, the magnification means being interposed between the entrance and the transducer means.

Conveniently, the transducer means comprises a CCD chip. Preferably, the entrance is situated in a forward facing portion of the housing, and the camera includes a reflector for reflecting light, incident in a direction perpendicular to the housing axis, along said axis.

Preferably, the transducer means has a light sensitive surface on which an image to be displayed is formed and which is substantially perpendicular to the housing axis.

The housing may to advantage be rotatably mounted on the headgear so as to be rotatable about its own axis, the transducer means being so positioned as to receive light from the magnifying means at any angular position of the housing (relative to its axis).

To that end, the transducer means is preferably either mounted in a fixed angular position on or in the housing so as to rotate therewith, and/or is mounted in a position in which it intersects the housing axis.

This enables the user to change the field of view of the camera simply by rotating the housing.

The housing may be between 25 and 50 mm long and preferably is of a length of not more than 40 mm.

Preferably, the magnifying means forms part of a focusing device for enabling the camera to obtain focused images of objects at varying distances therefrom, the focusing means being linked to the housing in such a way that rotation of the latter adjusts the focusing means.

Preferably, the focusing means is arranged so that rotation of the camera so as to lower the field of view enables the camera to focus on proximate objects whilst rotating the housing to raise the field of view enables focused images of distant objects to be obtained.

Such focusing means may comprise a lens which is mounted in the housing and is so connected to the housing as to be moved therealong by rotation of the housing about its axis.

According to a second aspect of the invention, there is provided an image detection system comprising a camera for detecting an image from a viewing direction, the attitude of the camera being adjustable to alter the elevation of the viewing direction, the camera having focusing means adjustable to enable to system to switch between a far focus mode, in which the camera focuses on distant objects, and a near focus mode, in which it focuses on proximate objects, wherein the system includes linkage means operatively linking the focusing means to the camera attitude so that the tilting of the viewing direction downwards causes the system to change from the far to the near focus mode.

Normally, when a person is looking into the far distance, they tend to look upwards by about 10°, whereas if they wish to read something (i.e. to focus on an object at a close distance), they tilt their eyes downwards by about 40°. If the change of attitude of the camera is used to mimic this change, the system of the invention will automatically refocus to enable the camera to view close objects, thus making the system particularly useful as a visual aid, for example a low visual rehabilitation system, to be worn by the user.

Preferably, the camera and display means are mounted on a headset to be worn by the user, at least part of the camera being movably mounted on the headset to enable the elevation of the viewing direction to be altered, the system being in the near focus mode at the lowest elevation of the viewing direction.

Preferably, the linkage means comprises a mechanical link between the camera and the headset, and the focusing means comprises lens means (for example a single lens or a system of lenses) in the camera, wherein said movement of the camera causes the linkage means to move the lens means relative to an image sensor in the camera.

Preferably, the linkage means causes a progressive adjustment of the focusing means between the two modes, in response to changes in the attitude of the camera.

Preferably, the camera comprises a cylindrical body, in which the focusing means is situated between the sensor means and a viewing port in the side of the body, wherein the camera includes at least one mirror for reflecting light, which has entered the viewing port, along the body to the sensor.

Conveniently, the body is rotatably mounted on a headset for rotation about its axis to change the elevation of said viewing directions.

Preferably, in this case, the mechanical linkage comprises a protuberance which engages in a part-helical guide, wherein rotation of the camera causes relative rotation of the protuberance and part helical guide about the axis of rotation of the camera, and wherein the protuberance engages or is attached to the lens means so that said rotation moves the lens means axially along the camera.

Preferably, the protuberance comprises a pin attached to a holder of the lens system, and the guide comprises a part-helical slot in the camera body, the pin extending through the slot and into a further guide which is fixed relative to the headset, and which extends in the direction of the body axis, thereby to provide angular location of the lens means relative to the camera body.

Preferably, when it is in near focus mode, the camera has a focus distance of approximately 240 mm with a near limit of depth of field of approximately 100 mm, and preferably has a hyper focal distance of approximately 4 m, with a far limit depth of field of 2 m infinity, when in its far focus mode.

Conveniently, the camera body is mounted transversely across the front of the head set.

Preferably, the system comprises a low vision rehabilitation system.

BRIEF DESCRIPTION OF THE DRAWINGS

The invention will now be described, by way of example only, with reference to the accompanying drawings, in which:

FIG. 1 is a cut-away side view of a low vision rehabilitation device having an image detection and magnification system in accordance with the invention;

FIG. 2 is a cut-away perspective view of the camera of the image detection and display system;

FIGS. 3a–3c show part of the camera, in relation to its mounting, at various different camera attitudes;

FIG. 5 is a representation of a possible relationship between camera tilt angle and focusing distances.

DETAILED DESCRIPTION

Figure 4:
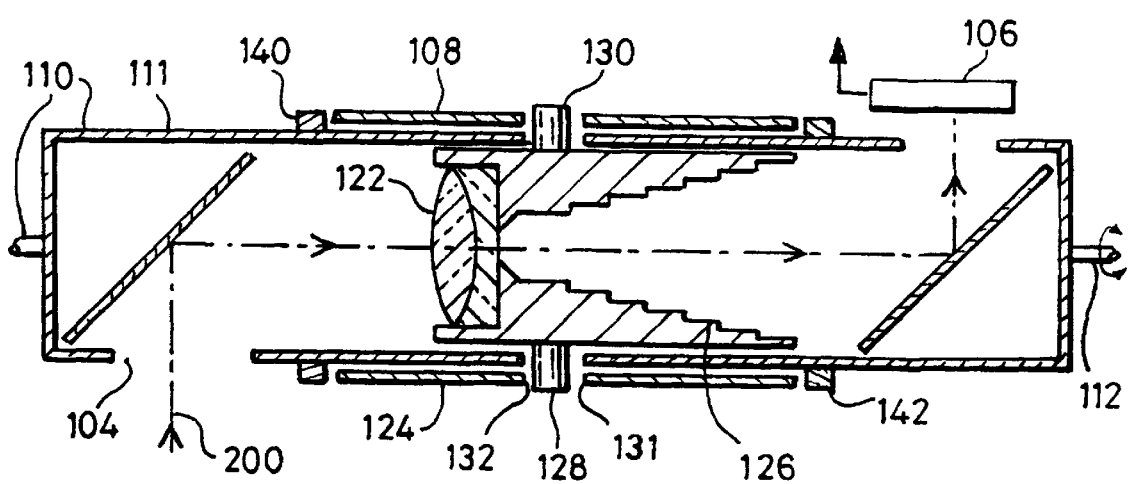
FIG. 4 is a sectional diagrammatic plan view of another type of camera which can be used in the system.

FIG. 1 shows a low vision rehabilitation system which includes a housing 1 in the general shape of a pair of spectacles. The housing 1 is attached to a pair of arms (for example 3) to extend over the user's ears to hold the housing in place in a similar fashion to spectacles. The housing 1 contains a pair of LCD screens 5 (one for each eye of the user), electronics 7 for operating the screens and a lens system 9, disposed between the screens and the eyes of the user (in use) and arranged to enable the user to focus on the screens (which are a relatively short distance away from the user's eyes). This arrangement of lenses and screens is already known from, for example, the Olympus EYE TRACK head-mounted LCD display device.

The housing 1 may also contain image enhancement electronics for enhancing the received images in a similar fashion to a conventional low vision rehabilitation system.

The housing also contains a camera 2 which comprises a cylindrical brass housing. With reference to FIG. 2, the cylindrical housing 11 has a viewing port 4 at one end, and an outlet port at the other end at which a sensor 6 having a CCD chip is situated. The cylinder of the camera 2 is rotatably held within a sleeve 8 attached to the housing 1.

A pair of rods 10 and 12 extend axially from opposite ends of the cylinder 11. The purpose of the rods is to enable the cylinder 11 to be rotated relative to the sleeve 8 from outside the housing. Each rod terminates in a respective knob, such as the knob 15 on the end of the rod 12.

Light entering the port 4, for example, along the path 16, is reflected by an end mirror 18 in the cylinder 11. The mirror 18 is angled so as to reflect light which arrives along a direction perpendicular to the cylinder axis through 90°, and hence in the direction of the cylinder axis to a second mirror 20 at the opposite end of the cylinder 11. The mirror 20 is, in turn, angled so as to reflect light into the sensor 6. In its passage along the interior of the cylinder 11, the light passes through a focusing lens system 22 which is held in position in a lens holder 24 having an integral lens hood 26 for preventing flare.

The holder 24 includes a pair of diametrically opposed pins 28 and 30 which project radially outwards therefrom. The pin 28 projects forwards whilst the pin 30 projects rearwardly.

The pin 28 extends through a slot 31 in the cylinder 11, and through a further registering slot 32 in the sleeve 8. The pin 30 passes through corresponding slots in the cylinder 11 and sleeve 8.

FIG. 3 shows the way in which the pin 28 cooperates with the slots 31 and 32. The arrangement of the pin 30 and corresponding slots is similar. As can be seen from FIG. 3, the slot 31 extends axially along the sleeve 8, and hence in the direction of the axis of rotation of the cylinder 11. The slot 31 therefore provides angular location of the pin 28 (and hence the holder 24) relative to the cylinder 11.

However, the slot 32 in the sleeve 8 is disposed at an angle to the axis of rotation of the cylinder, and is part helical.

Rotation of the cylinder 11 therefore causes the slot 32 to engage the pin 28. Since the pin has to rotate with the cylinder 11 by virtue of its engagement with slot 31, the action of the slot 32 on the pin 28 moves the latter along the slot 31, so that the holder 24 (and hence the lens system) is moved axially along the interior of the cylinder 11.

Accordingly, the rotation of the cylinder 11 alters the focus of the camera. However, rotation of the cylinder 11 will also change the orientation of the viewport 4 so that the viewing direction (shown as 16 in FIG. 2) will tilt about the axis of rotation of the cylinder 11.

The system is so arranged that, when the cylinder 11 is rotated to tilt the viewing direction downwards, the camera can focus on relatively close objects such as a book as indicated at 34 in FIG. 1. Rotation of the cylinder in the opposite direction, to tilt the viewing direction upwards, will adjust the characteristics of the camera so that it can focus on distant objects as shown at 36 in FIG. 1.

Accordingly, if somebody wearing the low vision rehabilitation system is initially looking at a distant object, but wishes to read a document which he or she is holding, the user simply rotates the cylinder 11 to tilt the viewing direction downwards and thus bring the subject matter to be read into the field of view of the camera, the focus of the camera being automatically adjusted.

The invention thus avoids the need for the camera to be fitted with a sophisticated automatic focus system for determining the distance of a given object in the field of view of the camera. Accordingly, the camera can be relatively cheap, compact and light.

The camera shown in FIG. 4 is the same as that shown in FIG. 2, apart from the orientation of the viewing port. Accordingly, corresponding components have been indicated by the reference numerals of FIG. 2 raised by 100.

The viewing port 104 is displaced through 90° relative to the viewing port of the camera shown in FIG. 2, so that, when the camera is mounted in a housing such as a housing 1 with the viewing port 104 in a position corresponding to that of the viewing port 4, the sensor 106 is positioned behind the cylinder 111.

The cylindrical bodies of the cameras shown in FIGS. 2 and 4 have spaced-apart annular collars (40 and 42 in FIG. 2, 140 and 142 in FIG. 4) positioned one on either side of the sleeve (8 or 108), and arranged to provide axial location of the cylindrical body relative to the housing 1.

FIG. 5 shows one possible relationship between the distance at which either type of camera is focused (i.e. the distance that an object would have to be from the camera in order to be in perfect focus) with the tilt angle of the viewing direction. The tilt angle is represented by a series of radiating lines, the top and bottom of which are referenced 260 and 262, the points of intersection between the line 264 and each of the radial lines indicating the focusing distance of the camera (as a distance along the radial line from its origin 266) for the tilt angle represented by that line.

Various modifications to the cameras are possible without departing from the scope of the invention. For example, the pitch of the helical slots may vary so that the sensitivity of the focusing mechanism to the tilting of the viewing direction will vary depending upon the attitude of the camera (i.e. the angle of the viewing direction with the horizontal plane containing the camera).

What is claimed is:

1. An image magnification and display system comprising a camera for generating an electrical output signal representative of a detected image, the camera being carried by a headset for attachment to the head of a user, the camera comprising a transducer means for generating an electrical output in response to light incident thereon and magnifying means, situated in the path of light to the transducer means, the transducer means and magnifying means being positioned such that, in use, the portion of the path of light passing through the magnifying means extends laterally across the front of the user's head.

2. A system according to claim 1, in which the camera is so positioned on the headset that, with the headset mounted on the head of a user, the portion of said path extends horizontally across the user's face from one side of the user's nose to the other.

3. A system according to claim 2, in which the camera further comprises an elongate housing having at one end region an entrance for incident light, the transducer means being situated in the region of the opposite end of the housing, the magnifying means being interposed between the entrance and the transducer means.

4. A system according to claim 3, in which the transducer means comprises a CCD chip.

5. A system according to claim 3, in which the entrance is situated in a forward facing portion of the housing, and the camera includes a reflector for reflecting light, incident in a direction perpendicular to the housing axis, along said axis.

6. A system according to claim 3, in which the transducer means has a light sensitive surface on which an image to be displayed is formed and which is substantially perpendicular to the housing axis.

7. A system according to claim 3, in which the housing is rotatably mounted on the headgear so as to be rotatable about its own axis, the transducer means being so positioned as to receive light from the magnifying means at any angular position of the housing.

8. A system according to claim 7, in which the transducer means is either mounted in a fixed angular position on or in the housing so as to rotate therewith.

9. A system according to claim 8, in which the magnifying means forms part of focusing means for enabling the camera to obtain focused images of objects at varying distances therefrom, the focusing means being linked to the housing in such a way that rotation of the latter adjusts the focusing means.

10. A system according to claim 9, in which the focusing means is so arranged that rotation of the camera so as to lower the field of view enables the camera to focus on proximate objects whilst rotating the housing to raise the field of view enables focused images of distant objects to be obtained.

11. A system according to claim 10, in which the focusing means comprises a lens which is mounted in the housing and is so connected to the housing as to be moved therealong by rotation of the housing about its axis.

12. A system according to claim 1, in which the system comprises a low vision rehabilitation.

13. An image detection and display system comprising a camera for detecting an image from a viewing direction, the attitude of the camera being adjustable to alter the elevation of the viewing direction, the camera having focusing means adjustable to enable the system to switch between a far focus mode, in which the camera focuses on distant objects, and a near focus mode, in which it focuses on proximate objects, wherein the system includes linkage means operatively linking the focusing means to the camera attitude so that the tilting of the viewing direction downwards causes the system to change from the far to the near focus mode.

14. A system according to claim 13, in which the camera is mounted on a headset to be worn by the user, at least part of the camera being movably mounted on the headset to enable the elevation of the viewing direction to be altered, the system being in the near focus mode at the lowest elevation of the viewing direction.

15. A system according to claim 13, in which the linkage means comprises a mechanical link between the camera and the headset, and the focusing means comprises lens means in the camera, wherein a movement of the camera causes the linkage means to move the lens means relative to an image sensor in the camera.

16. A system according to claim 15, in which the camera comprises a cylindrical body, in which the focusing means is situated between the sensor and a viewing port in the side of the body, wherein the camera includes at least one mirror for reflecting light, which has entered the viewing port, along the body to the sensor.

17. A system according to claim 16, in which the body is rotatably mounted on a headset for rotation about its axis to change the elevation of said viewing direction.

18. A system according to claim 17, in which the linkage means comprises a protuberance which engages in a part-helical guide, wherein rotation of the camera causes relative rotation of the protuberance and part helical guide about the axis of rotation of the camera, and wherein the protuberance engages or is attached to the lens means so that said rotation moves the lens means axially along the camera.

19. A system according to claim 18, in which the protuberance comprises a pin attached to a holder of the lens means, and the guide comprises a part-helical slot in the camera body, the pin extending through the slot and into a further guide which is fixed relative to the headset, and which extends in the direction of the body axis, thereby to provide angular location of the lens means relative to the camera body.

20. A system according to claim 13, in which the linkage means is so arranged as to cause a progressive adjustment of the focusing means between the two modes, in response to changes in the attitude of the camera.

21. A system according to claim 13, in which when in its near focus mode, the camera has a focus distance of approximately 240 mm with a near limit of depth of field of approximately 100 mm, and preferably has a hyper focal distance of approximately 4 m, with a far limit depth of field of 2 m infinity, when in its far focus mode.

22. A system according to claim 13, in which the camera body is mounted transversely across the front of a headset.

\* \* \* \* \*